United States Patent [19]

Inoue

[11] Patent Number: 4,475,339
[45] Date of Patent: Oct. 9, 1984

[54] APPARATUS FOR CONTROLLING BRAKING LIQUID PRESSURE

[75] Inventor: Hidefumi Inoue, Ohmiya, Japan
[73] Assignee: Jidosha Kiki Co., Ltd., Tokyo, Japan
[21] Appl. No.: 458,091
[22] Filed: Jan. 14, 1983
[30] Foreign Application Priority Data Jan. 26, 1982 [JP] Japan .................. 57-9044[U]

[51] Int. Cl.³ .................. B60T 8/26; B60T 11/34
[52] U.S. Cl. .................. 60/591; 188/349;
303/6 C; 29/157.1 R; 29/511
[58] Field of Search .................. 60/591, 561; 188/349;
303/6 C; 137/454.5; 29/157.1 R, 511

[56] References Cited

U.S. PATENT DOCUMENTS

| | | | |
|---|---|---|---|
| 3,644,874 | 2/1972 | Hutter | 29/511 |
| 3,964,795 | 6/1976 | Mathues | 303/6 C |
| 4,174,867 | 11/1979 | Oberthur | 303/6 C |
| 4,317,598 | 3/1982 | Tandler | 303/6 C |
| 4,325,407 | 4/1982 | Weiler et al. | 303/6 C |

FOREIGN PATENT DOCUMENTS 55-55044 4/1980 Japan .
56-50838 5/1981 Japan .

Primary Examiner—Robert E. Garrett
Assistant Examiner—Scott L. Moritz
Attorney, Agent, or Firm—Flynn, Thiel, Boutell & Tanis

[57] ABSTRACT

An apparatus for controlling braking liquid pressure produces a proportionate reduction in an input liquid pressure supplied from a master cylinder before it is output to a rear wheel cylinder. The apparatus includes a body which is formed of a single member and which is formed with a bore in which a plunger slides. An annular retainer having an inner diameter less than that of the bore is fitted into the bore at its end nearer the master cylinder. One end of the plunger extends through the annular retainer.

10 Claims, 2 Drawing Figures

APPARATUS FOR CONTROLLING BRAKING LIQUID PRESSURE

BACKGROUND OF THE INVENTION

The invention relates to an apparatus for controlling braking liquid pressure which may be used in a braking system of a vehicle to produce a proportionate reduction in an input liquid pressure to derive an output liquid pressure.

An apparatus for controlling braking liquid pressure is used in order to produce braking efforts of an equal magnitude for both the front and the rear wheels during the initial phase of a braking operation when such efforts are at their low level, and to reduce the braking effort applied to the rear wheels as compared to that applied to the front wheels so that both the front and the rear wheels may be locked simultaneously whenever the braking effort exceeds a given value. At this end, such apparatus includes a plunger which is responsive to the pressure prevailing in a master cylinder to open or close a valve, which in turn produces a proportionate reduction in the pressure transmitted from the master cylinder before it is applied to a rear wheel cylinder.

In a usual apparatus for controlling braking liquid pressure, a plunger used therein has opposite end faces of different areas which are subject to respective pressures so as to be operated in accordance with the master cylinder pressure which is applied to the both end faces. Accordingly, the plunger is slidably disposed within a bore formed in a body. The bore has portions of an increased and a reduced diameter, and the portion of the increased diameter is closed by a plug in order to contain the plunger within the bore. Thus, a combination of the body which contains the plunger and the plug is used. However, the combination of the body and the plug presents a limit in reducing the size of the profile of the apparatus and also poses a problem in that a high accuracy is required in assembly and machining to achieve the concentricity between the body and the plug since the plunger is disposed in sliding contact with both the body and the plug. It is proposed to crimp the plug to the body so as to provide an integral construction. With this construction, a torque of an increased magnitude is applied to the crimped regions when mounting the apparatus on the master cylinder, and also an excessive load is applied to the crimped regions during the operation, thus presenting another difficulty that an increased strength requirement is imposed upon the crimped regions.

SUMMARY OF THE INVENTION

Therefore, it is an object of the invention to provide an apparatus for controlling braking liquid pressure which is simple and compact in construction. This object is achieved by molding a cylindrical body from a single member and by fitting a retainer into a bore formed in the body on the side nearer the master cylinder, with one end of a plunger projecting through the retainer.

It is another object of the invention to provide an apparatus for controlling braking liquid pressure which facilitates its mounting on or dismounting from the master cylinder.

It is a further object of the invention to provide an apparatus for controlling braking liquid pressure which eliminates the need for the concentricity between the body and the plug and which allows a facilitated assembly and machining with a high accuracy.

Other objects and advantages of the invention will become apparent from the following description with reference to the attached drawings.

DESCRIPTION OF EMBODIMENTS

Figure 1:
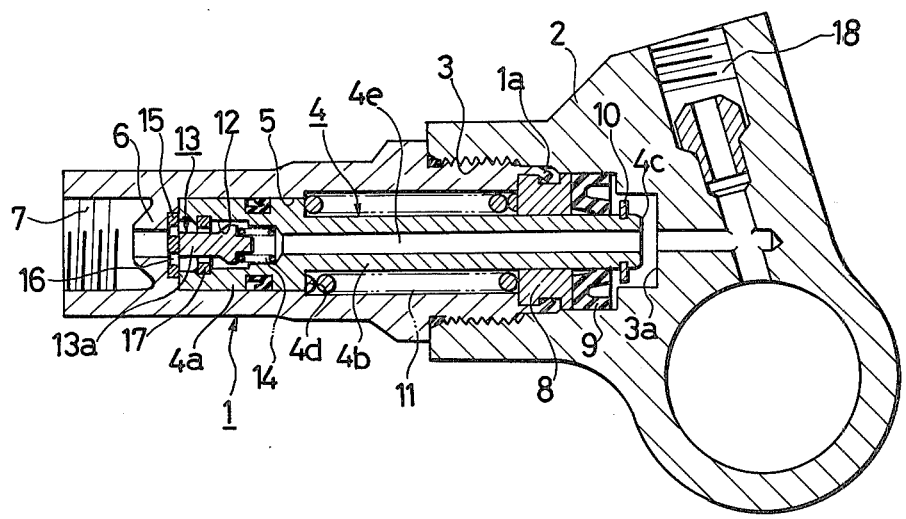
FIG. 1 is a longitudinal section of one embodiment of the invention.

Referring to FIG. 1, there is shown a body 1 which is molded from a single member into substantially cylindrical configuration. A master cylinder includes a casing 2 in which a mounting hole 3 is formed, in which the body is threadably engaged. The body 1 is formed with an axially extending bore, the central portion of which represents a slide bore 5 in which a plunger 4 is slidably disposed. A nodule 6 is formed in contiguous relationship with the bore 5 and extends radially inward. An output port 7 for communication with a rear wheel cylinder, not shown, is defined in the outer end of the body. An annular retainer 8 having a inner diameter less than the inner diameter of the slide bore 5 is fitted into the bore formed in the body 1 at its end abutting against the master cylinder. An annular seal member 9 is disposed in abutting relationship with the end face of the retainer 8 which is opposite from the body 1. The annular retainer is mounted in the body 1 by externally crimping a cylindrical end portion 1a of the body 1, thus facilitating its assembly.

The plunger 4 has a portion 4a of an increased diameter which is disposed in fitting engagement with the slide bore 5, and also includes a portion 4b of a reduced diameter which extends toward the master cylinder. The free end of the portion 4b extends through the retainer 8 and the seal member 9, with its projecting end portion 4c having an end face which is located opposite to the bottom surface 3a of the mounting hole 3. The seal member 9 is disposed in sliding contact with the portion 4b, of a reduced diameter, of the plunger 4 in a liquid tight manner and is also tightly fitted against the inner wall of the mounting hole 3, thus preventing any leakage of hydraulic oil discharged from the master cylinder to the exterior. It will be noted that a snap ring 10 is fitted on a portion of the reduced diameter portion 4b which projects beyond the seal member 9 so the seal member 9 can be disengaged by the snap ring 10 whenever the body 1 is removed out of the casing 2.

A spring 11 is disposed between a step 4d defined between the portions 4a and 4b of increased and reduced diameters of the plunger 4 and the retainer 8, whereby the plunger 4 is normally urged to the left, as viewed in FIG. 1, or toward the nodule 6. As is well recognized, when the plunger 4 is moved to the right against the resilience of the spring, an output liquid pressure from the output port 7 will be reduced as compared with the input liquid pressure supplied from the master cylinder. Such reduction of the pressure is performed by the action of a valve body 13 received within a valve chamber 12 which is formed within the increased diameter portion 4a of the plunger 4. The valve body 13 is normally urged toward the nodule 6 by a spring 14 extending between it and the bottom of the valve chamber 12. The valve body 12 has an end 13a of a reduced diameter which normally projects through a bore formed in an annular valve seat 17 which is fitted into the opening of the valve chamber 13. A disc 15 is fitted into the opposing end face of the nodule 6 for abutment by the end 13a of the valve body 13. The disc 15 is formed with openings 16 which allow a communication between the valve chamber 12 and the output port 7, whereby the hydraulic oil passing through a passage 4e formed in alignment with the axis of the plunger 4 can be introduced into the output port 7.

When the apparatus is inoperative, the plunger 4 is urged by the spring 11 into abutment against the nodule 6 while the valve body 13 abuts against the disc 15 and thus is clear from the valve seat 17. Accordingly, the hydraulic oil supplied from the master cylinder passes through the passage 4e, the valve chamber 12 and the openings 16 to be introduced into the output port 7 so as to be supplied to the rear wheel cylinder. When the input liquid pressure from the master cylinder increases above a given value, the plunger 4 is moved to the right against the resilience of the spring 11 since the end face of the increased diameter portion 4a has a greater area, subject to the liquid pressure, than the area of the end face of the projecting end 4c of the plunger 4. It will be seen that such rightward movement is limited by the abutment of the projecting end 4c against the bottom surface 3a of the mounting hole 3. On the other hand, since the valve body 13 is urged by the spring 14, it moves relative to the valve seat 17 until it becomes seated on the latter. Thereupon, the path for the hydraulic oil to the output port 7 is interrupted, ceasing a further increase in the output liquid pressure. As the input liquid pressure continues to increase, such liquid pressure causes the plunger 4 to move to the left, whereby the valve body 13, abutting against the disc 15, is again moved clear from the valve seat 17, allowing the liquid pressure introduced into the output port 7 to increase again. A further increase in the liquid pressure causes a movement of the plunger 4 to the right as mentioned above. Such process is repeated to produce a proportionate reduction of the input liquid pressure to derive an output liquid pressure. It is to be understood that during the time the liquid pressure supplied to the rear wheel cylinder is controllably reduced by the operation described above, the liquid pressure from the master cylinder is directly introduced into the front wheel cylinder through an output port 18.

As a result of the described construction, during the assembly operation, the valve body 13 is initially inserted into the plunger 4, which is then assembled into the body 1. After inserting the spring 11, the retainer 8 is fitted into the cylindrical end portion 1a of a reduced thickness. The cylindrical end portion 1a may then be crimped to secure the retainer 8 in place. The seal member 9 is then fitted over the plunger, followed by the fitting of the snap ring 10. The integral assembly may be threadably engaged with the mounting hole 3 of the casing 2. When an inspection or replacement of the apparatus is desired, the body 1 may be removed from the mounting hole 3, and then all the components can be disassembled by a procedure which is opposite to that mentioned above, thus facilitating the required operation.

In the above description, the retainer 8 has been fixed in place by crimping the cylindrical end portion 1a of a reduced thickness. However, it should be understood that the crimped region is located outside the flow path of the hydraulic oil and hence is not subject to the action of the liquid pressure. Accordingly, no increased strength requirement is required of the crimped region, which maintains a high reliability over a prolonged period of use. It should also be noted that it is unnecessary to utilize the crimping to fix the retainer 8, which may be a press fit.

Figure 2:
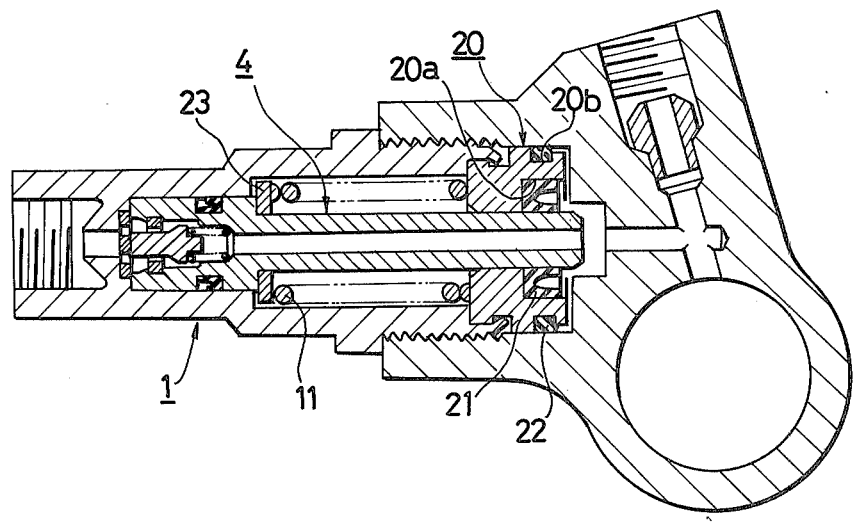
FIG. 2 is a longitudinal section of another embodiment of the invention.

FIG. 2 shows a second embodiment of the invention which is similar to the embodiment mentioned above except for the arrangement associated with a retainer. Specifically, a retainer 20 is secured to a cylindrical end portion 1a of the body 1 which has a reduced thickness, by crimping. A recess 20a is formed around the inner periphery of the retainer 20, and a seal member 21 is fitted into the recess 20a. An annular groove 20b is formed around the outer periphery of the retainer, and receives an O-ring 22. Thus, the seal member 21 maintains a liquid tightness between the interior of the body 1 and the master cylinder while the O-ring 22 maintains a liquid tightness between the master cylinder and the exterior. This is compared to the first mentioned embodiment in which the seal member 9 serves maintaining the liquid tightness for all purposes. This represents a structural difference between the both embodiments. In the second embodiment, it will be noted that a spring seat 23 is defined adjacent to the step 4d formed in the plunger 4, with the spring 11 extending between the spring seat 23 and the retainer 20.

The second embodiment operates in the similar manner as the first mentioned embodiment, and therefore will not be described.

While the invention has been shown and described above in terms of several embodiments thereof, it should be understood that a variety of changes and modifications are possible therein without departing from the spirit and scope of the invention as defined by the appended claims.

What is claimed is:

1. An apparatus for controlling braking liquid pressure including a hollow substantially cylindrical body having its one end threadably engaged in a mounting hole in the casing of a master cylinder and its other end operatively connected to a rear wheel cylinder for supplying pressure from said master cylinder to said rear wheel cylinder, the hollow body being formed with an axially extending bore, a plunger slidably disposed within the bore and formed therein with a passage which allows pressure supply from the master cylinder to the rear wheel cylinder, and a valve body housed within the passage and shiftable with respect to said plunger and master cylinder to open or close the passage, the plunger being responsive to the magnitude of an input liquid pressure supplied from the master cylinder by reciprocating to cooperate with the valve body to open or close the passage, thereby producing a proportionate reduction in the input liquid pressure before it is output to the rear wheel cylinder, the hollow body being formed of a single member, an annular retainer having an inner diameter less than that of the bore, the annular retainer being fitted into the bore at the end of the bore nearer the master cylinder, with one end of the plunger projecting through the annular retainer, the end face of the projecting end of the plunger being directly opposed to the bottom surface of the mounting hole in the master cylinder casing, the movement of said one plunger end being positively limited in one direction by the abutment thereof against said mounting hole bottom surface.

2. An apparatus according to claim 1 in which an annular seal member is mounted inside and facing the bottom end of the mounting hole of the master cylinder casing in contiguous relationship with the annular retainer, said one end of the plunger extending through the seal member.

3. An apparatus according to claim 2 including a snap ring fixed on the one end of the plunger where it projects beyond the seal member, said snap ring being disposed between said seal member and the bottom surface of the mounting hole in the master cylinder casing.

4. An apparatus according to claim 1 including a radially enlarged recess in the end of the plunger passage furthest from the bottom surface of the master cylinder casing mounting hole and adjacent to the connection to the rear wheel cylinder, a valve seat fixed in said radially enlarged recess in said plunger and through which said valve body is loosely axially reciprocable, said valve body being axially shorter than said plunger and having an inner end facing toward but separated from the master cylinder mounting hole bottom surface by the length of said passage, which passage is empty and extends through major length of said plunger, namely from said recess to said one end of said plunger at said master cylinder, spring means engageable with the inner end portion of said valve body for resiliently urging said valve body axially away from said master cylinder and toward the connection to said rear wheel cylinder, porous means fixed at the rear wheel cylinder connected end of said hollow body for blocking closure of said valve body against said valve seat with said plunger in its position most remote from said master cylinder, said plunger being shiftable toward said master cylinder sufficient to enable closure of said valve body against said valve seat prior to impact of said plunger against the bottom surface of said master cylinder mounting hole.

5. An apparatus according to claim 1 in which the annular retainer is formed with a recess around its inner periphery in which the seal member is mounted, said one end of the plunger extending through the seal member.

6. An apparatus according to claim 5 in which the annular retainer is formed with an annular groove around its outer periphery in which an O-ring is fitted.

7. An apparatus according to claim 1 in which the plunger is stepped and has portions of an increased and a reduced diameter.

8. An apparatus according to claim 7 in which a spring seat is formed on the step of the plunger, with a spring extending between the spring seat and the annular retainer.

9. An apparatus according to claim 1 in which an end of the hollow body is formed with a cylindrical portion of a reduced thickness crimped from the outside to secure the annular retainer to the hollow body.

10. An apparatus according to claim 1 in which the annular retainer is secured in place by a press fit in a cylindrical end of the hollow body.

* * * * *